United States Patent
Hollaway

(10) Patent No.: US 8,682,458 B2
(45) Date of Patent: Mar. 25, 2014

(54) LOW MAINTENANCE SPA CONTROL SYSTEM

(75) Inventor: Jerrell P. Hollaway, Melbourne, FL (US)

(73) Assignee: Balboa Water Group, Inc., Tustin, CA (US)

( * ) Notice: Subject to any disclaimer, the term of this patent is extended or adjusted under 35 U.S.C. 154(b) by 73 days.

(21) Appl. No.: 13/367,698

(22) Filed: Feb. 7, 2012

(65) Prior Publication Data

US 2012/0226383 A1   Sep. 6, 2012

(51) Int. Cl.
*G06F 19/00* (2011.01)

(52) U.S. Cl.
USPC .............................. 700/79; 700/282; 362/562

(58) Field of Classification Search
USPC ................ 700/79, 282; 362/562, 373; 4/493; 709/201; 361/623; 340/635, 650, 664; 307/112, 149; 219/490
See application file for complete search history.

(56) References Cited

U.S. PATENT DOCUMENTS

| | | | |
|---|---|---|---|
| 5,361,215 A * | 11/1994 | Tompkins et al. | 700/300 |
| 5,932,127 A * | 8/1999 | Maddox | 219/492 |
| 6,282,370 B1 * | 8/2001 | Cline et al. | 392/465 |
| 6,355,913 B1 * | 3/2002 | Authier et al. | 219/481 |
| 6,590,188 B2 * | 7/2003 | Cline et al. | 219/497 |
| 7,057,140 B2 * | 6/2006 | Pittman | 219/481 |

* cited by examiner

*Primary Examiner* — Kidest Bahta
(74) *Attorney, Agent, or Firm* — Larry K. Roberts

(57) ABSTRACT

A spa control system designed to reduce maintenance cost by providing modular construction for major control functions, with built-in diagnostic capabilities for isolating defective spa components. Multi-colored LEDs on the spaside panel constantly report the status of each component of the spa as well as the status of the functional modules themselves. Each time a component is activated, measurements of operational parameters, such as load currents, are instantly made and evaluated so that the proper LED color can be presented at the spaside. Since major functions such as audio, LED control, wireless, and spa logic are separated into removable modules, repair of the control system requires less time and less skilled personnel. Other design improvements, such as direct monitoring of heater element temperature and the purging of pumps on an as required-basis, enhance the spa's overall reliability and thus reduce the need for maintenance.

19 Claims, 5 Drawing Sheets

LOW MAINTENANCE SPA CONTROL SYSTEM

CROSS-REFERENCE TO RELATED APPLICATION

This application is a continuation application which claims the benefit of U.S. application Ser. No. 12/316,350, filed Dec. 12, 2008, the entire contents of which application is hereby incorporated by reference. This application also claims the benefit of U.S. application Ser. No. 12/586,712, filed Sep. 28, 2009, and U.S. application Ser. No. 12/661,185, filed Mar. 12, 2010, the entire contents of which applications are incorporated herein by this reference.

BACKGROUND OF THE INVENTION

1. Field of the Invention

The present invention relates to electronic control systems used in spas and hot tubs.

2. Description of Related Art

Electronic controls have been developed for spas that give the user effective control of the various electrical equipment, such as motors, lights, and heaters. Typically, a spaside control with a microprocessor is used to manage the overall spa function. The spaside communicates with other components in the control system which turn the equipment on and off according to programming instructions in the spaside and inputs from various sensors. Optional equipments, such as stereo sound systems, are most often separate from the main control system, creating some inconvenience for the user.

Control systems having some integration still make little attempt to physically separate functions for the purpose of troubleshooting and replacement of components. Likewise, it is common to find circuit boards with mixed technology (SMT and thru-hole), due to the need to have high power and low power parts on the same board, which requires extra processing steps for each of these boards.

As electronic spa control systems have become more common, the cost of maintaining these control systems has grown to unacceptable levels. This high cost is attributable to the complexity of design, with higher part counts and attendant failure rates, as well as the need for technicians with greater training.

U.S. Pat. No. 6,756,907B2, Hollaway, teaches the use of built-in diagnostic routines that measure load current, and other parameters, to isolate defective components in a spa. These routines are especially useful in identifying defective motors, heaters, and fuses. The routines are usually started by an operator whenever the spa does not appear to be operating properly.

Some progress has been made to eliminate unreliable components from the control system. U.S. Pat. No. 6,282,370, Cline, et al, teaches the use of two temperature sensors on or near the heater that replaces pressure and flow sensors by turning off the heater if certain temperature profiles are observed, indicating inadequate water flow in the heater. For the Cline invention to work properly, however, both sensors must be placed on the heater and a minimum flow must be maintained. This invention teaches only reactions to a positive difference between the sensor downstream from the heater and the sensor upstream from the heater. If the positive difference is greater than a prescribed amount, it is assumed that there is a flow problem causing the heat buildup. No consideration is made for one of the sensors being defective or for incorrect placement on the heater.

Cline also teaches the use of an independent circuit apparatus to deactivate the heater if a temperature sensor exceeds a predetermined temperature. While this is a useful improvement for providing a backup for the regular high limit control, no provision is made to use the temperature sensors to back up the flow monitoring system.

SUMMARY OF THE INVENTION

The present invention teaches a highly integrated spa control system that improves reliability and maintainability through extensive use of modular functions and segregation of high voltage and low voltage circuit boards. A major benefit in manufacturing is also enjoyed by using all SMT construction on low voltage boards and all thru-hole construction on high voltage boards. In a preferred embodiment, the modular functions are constructed with low voltage, SMT circuits and enclosed in plastic housings. The modules are designed to be easily removable from the main board with the cover of the pack still in place.

All spa logic functions, previously located in the spa side, are located on a low voltage logic board in the equipment pack. This arrangement allows the use of multiple spasides and remote controls, all receiving the same display information and sending similar user interface instructions.

A simplified flow detection system using only a water temperature sensor and a heater temperature sensor is described herein. It is well known that only a small flow of water is required to eventually bring the heater housing within a few degrees of the water temperature in the spa. It is not necessary for both sensors to actually be in the water, as described by U.S. Pat. No. 6,253,227, Tompkins, et al, nor is it necessary to place both sensors on the heater, as described by U.S. Pat. No. 6,282,370, Cline, et al. A decision to disable the heater can clearly be made in a reasonable time if the water temperature and the heater housing (with or without water inside) is different by more than a prescribed amount, because a heater with flowing water will maintain a housing temperature within a very few degrees of the water in the spa, even with the heater energized.

A preferred embodiment places a sensor as near as possible to the actual heating element. This placement provides the fastest response to flow or water problems, yet does not risk damage to the sensor or the heater because of the almost instant reaction of the sensor.

With so much dependence on the reliability of the water and heater sensors, it is desirable to design a failsafe scheme for energizing the heater. This is accomplished by applying the rule that the heater can only be energized when the absolute temperature difference between the sensors is less than a prescribed difference. Unlike the aforementioned patents, the heater will then be defeated even if the heater sensor is cooler than the water sensor. This scheme accounts for sensors that may be defective or misplaced. In other words, all failures will leave the heater operation in a safe condition, hereafter referred to as "failsafe".

An independent control circuit is herein described that will de-energize the heater whenever either temperature sensor measures a temperature greater than a prescribed temperature. This same circuit will also de-energize the heater if the absolute difference between the sensors is greater than a prescribed difference. In this manner, this independent circuit provides a backup for the standard high-limit circuit as well as for the previously described flow detection circuit.

Improved designs for other control functions are also disclosed. The audio circuit of a preferred embodiment uses Class D amplifiers contained in a single integrated circuit, requiring less space and generating less heat. The FM tuner is also a reliable, single chip design requiring less maintenance. A digital signal processor (DSP) on a single chip eliminates extensive crossover networks.

A single LED control circuit furnishes power to various LED lighting locations in the spa. This arrangement allows integrated control from a user interface, with special features like dimming and music modulation of the LEDs easily achievable.

A key to low maintenance, other than improved reliability, is the ease in which defective parts can be identified and replaced. Major control functions in a preferred embodiment are separated into removable modules. A built-in diagnostic routine isolates defective components, similar to the Hollaway patent, but performs the required diagnostic steps each time a component is activated. This real-time evaluation is desired so that an associated multi-colored LED on the spaside panel, or any other user interface, can immediately show a color associated with the performance status of the activated component.

The components that can be evaluated include hi-speed pumps, lo-speed pumps, circulation pumps, heaters, and blowers.

The removable modules that can be evaluated, and identified for replacement, include controls for audio, LEDs, wireless, and logic.

DETAILED DESCRIPTION OF THE PREFERRED EMBODIMENT

Figure 1:
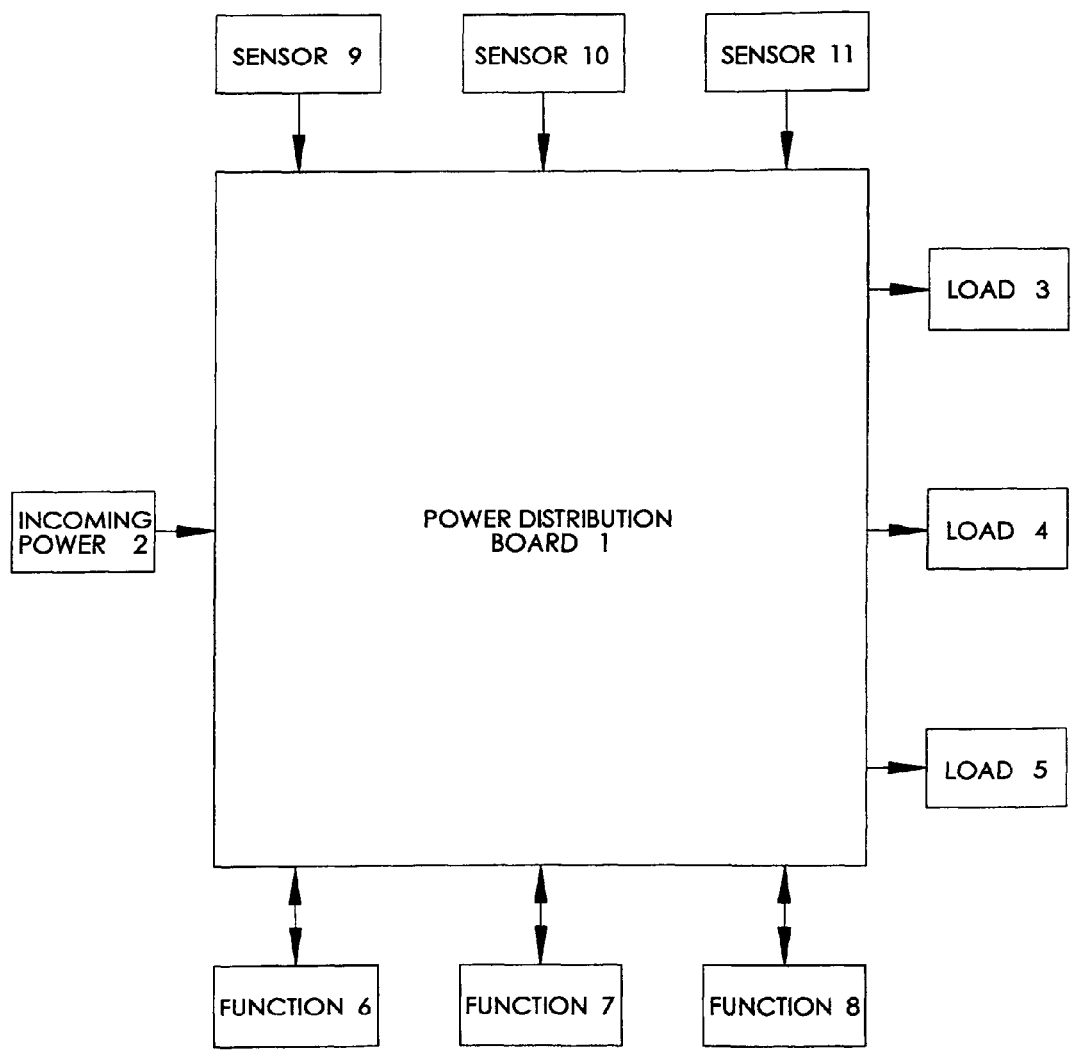
FIG. 1 shows a preferred embodiment of the present invention used in a spa.

Referring to FIG. 1, a spa control system according to the present invention may consist of a Power Distribution Board 1 to receive Incoming Power 2 and to distribute the power to Load 3, Load 4, and Load 5, where 5 represents any number of additional loads. Typical electrical loads in a spa may consist of single speed motors, multiple speed motors, variable speed motors, water heaters, LEDs, light bulbs, speakers, video displays, cover alarm sound devices, cover lift devices, wave producing devices, ozone producing devices, chemical dispensers for chlorine or bromine, devices for producing chlorine or bromine, and valve controllers.

Function 6, Function 7, and Function 8, where 8 represents any number of additional functions, include at least a logic function to manage the various spa operations such as water temperature control, motor activation, and communication with user interfaces. Other functions may include a light function made up with LED and bulb driver circuits, audio and video circuits, ORP, PH, and ozone analysis and control circuits, cover alarm control circuits, drain entrapment control circuits, wave and valve controller circuits, voice recognition circuits, wireless links, and various forms of user interfaces such as spasides and remotes.

Sensor 9, Sensor 10, and Sensor 11, where 11 represents any number of additional sensors, provide input data to the various functions. The logic function will require inputs from water and heater temperature sensors, for example, to manage the heater operation. Other sensor inputs may include PH, ORP, ozone, cover position, voice, drain suction, line voltage, and line current.

Power Distribution Board 1 can be further described as a thru-hole board with high voltage and high current parts. Input Power 2 will connect to terminals which in turn will be connected, through fuses, to high power relays. These relays will supply power to high power loads according to signals from the logic function.

Functions 6, 7, and 8 are plug-in boards in this preferred embodiment. Card edge connectors on Board 1 are used to receive most of the various function boards, while boards used in spasides and remotes may use cable and plug connectors or wireless links. These boards can be further described as low voltage, low current boards with SMT construction. Each board contains, as much as possible, all of the circuitry required to accomplish a certain function. An audio board, for example, may contain an amplifier, tuner, antenna, line input connector, and output connections. A problem with audio performance in the field should then, in most cases, be solved by simply replacing the audio board. Likewise, by placing all of the logic functions on one board, other spa performance issues may be solved by replacing just the logic function board.

Figure 2:
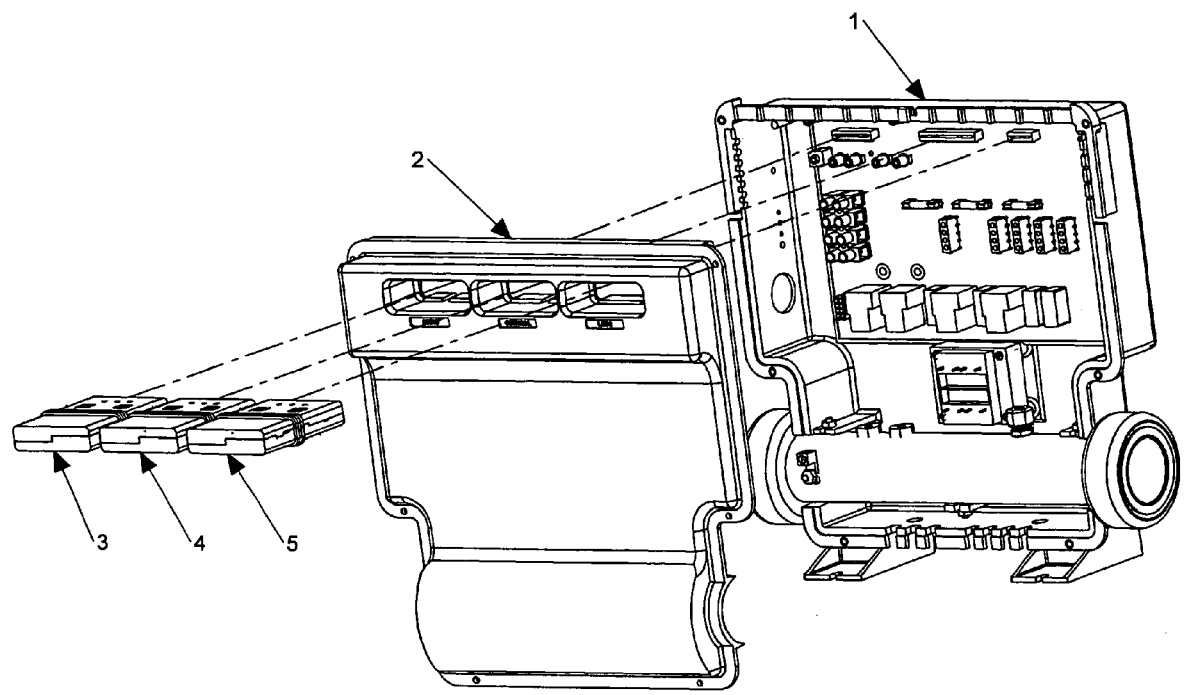
FIG. 2 shows modules removable from the main circuit board of the control system.

FIG. 2 illustrates a preferred embodiment in which the various function boards are enclosed in protective plastic housings, creating modules. Modules 3, 4, and 5 can be easily removed and replaced through cutouts in lid 2 of pack enclosure 1.

Sensors 9, 10, and 11 include a temperature sensor placed in the water and a temperature sensor placed on the body of the heater or, preferably, on the heating element of the heater. In this embodiment, most sensors connect to Power Distribution Board 1 where their signals are routed to one or more function boards. It is preferred that a line current sensor is placed directly on Board 1.

The standard function of the water sensor is to monitor the body of water to determine when to energize the heater. The standard function of the heater sensor is to monitor for very cold or very hot temperatures at the heater.

Another new function can be accomplished by monitoring the water and heater sensors together. That function is to replace the classic flow switch or pressure switch with a novel rule for energizing the heater. That rule is to simply leave the heater de-energized anytime the two sensors measure an absolute difference in temperature of more than a prescribed difference, say 6 degrees. It is well known that after a period of time these sensors will track each other within 1-3 degrees if water is flowing and the sensor circuits are working properly. A larger difference means that either the flow is inadequate or there is a hardware failure. In either event, the heater will not be energized.

When the heater is energized, it is preferred to limit the amount of energy supplied by the heater element until the resulting heat rise has time to reach the sensor mounted on the heater body under all possible conditions, including a dry heater. With heat transfer only through the air and the walls of the heater body, the heater sensor may not measure an increase in temperature in time to prevent damage. The heater is, therefore, always turned on for a few seconds, followed by a delay of several seconds to allow time for any excessive heat to reach the heater sensor. If water flow is present, there will be no excessive heat and the heater can safely be energized for a longer period.

When all tests are passed and the heater is energized for a long period, the two sensors will be continuously monitored to see that the absolute difference remains with a prescribed difference, say 8 degrees. If not, the heater must be de-energized. A higher number of degrees is picked for the long term monitoring to prevent rapid activation and de-activation of the heater.

Figure 3:
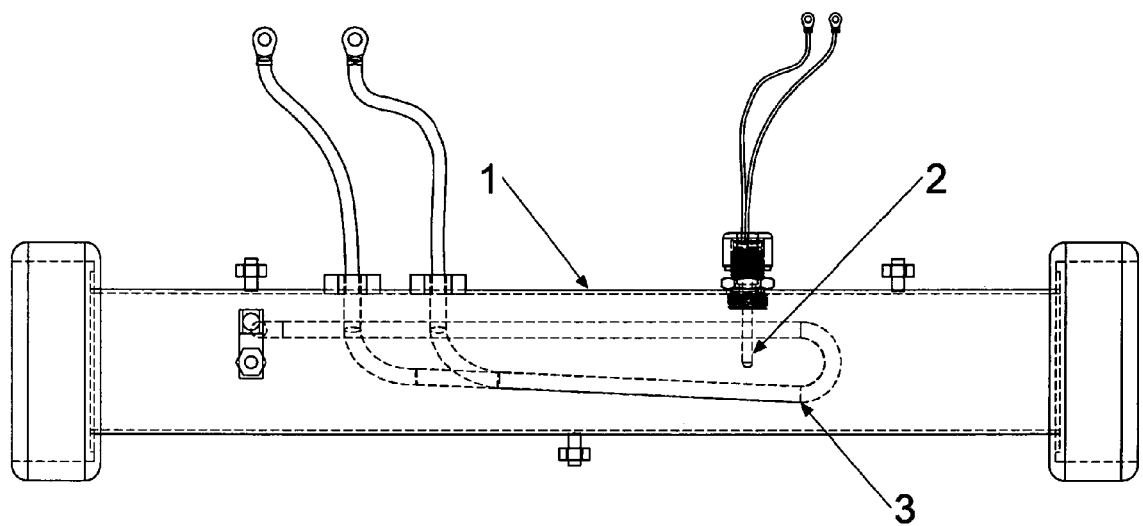
FIG. 3 shows the relative positioning of a temperature sensor at the heating element of a heater.

It is much preferred to just place the heater temperature sensor on, or very near, the actual heating element. FIG. 3 illustrates temperature sensor 5 thermally coupled to heating element 3 of heater 1 so that the need for a delay, as just described, is minimized or eliminated. The rapid temperature rise of the element, in the absence of moving water, will cause the critical difference between the two sensors to occur in a matter of seconds, thereby causing the heater to be disconnected from the power source before any damage can occur to the sensor or the heater.

The logic function may also include an independent processor to monitor the water and heater sensors in much the same way as just described. In this case, a temperature higher than the highest temperature allowed by the primary processor, in either the water or at the heater, will cause a pair of redundant relays to de-energize the heater. Also, if the absolute difference between the sensors is higher than the difference allowed by the primary processor, the heater will be defeated. The independent processor thus becomes a backup system for both high temperature limit conditions and non-flow conditions.

Referring again to FIG. 1, Functions 6, 7, and 8 will usually include a user interface of some type, most often a spaside or remote control. The preferred embodiment uses a logic function, connected to Board 1, to send a broadcast of spa operational data to all other functions on a communications bus. This regular broadcast allows each function to retrieve the data required for that function and to ignore all other data. A spaside, for example would need to know the time of day for display purposes. An audio board would need to know the music source and loudness level, but doesn't need to know the time of day. In turn, each function may send over the same bus, when polled at the appointed time, information that is required by other functions. An example of this would be the station frequency of a recently scanned radio station. This data would be sent by the audio function to the logic function which would, in turn, include that station frequency in the next broadcast for display by one or more spasides. A spaside would send as it's unique data the identification of any switch that was pressed, for example, to turn on a certain pump motor. This novel design allows various and different user interfaces, such as a wireless link to a PC, since the broadcast data can be used as required and switch instructions to turn on a certain motor can come from anywhere. All operational rules for the spa are contained in the logic function. All user interfaces operate as slaves to the logic function.

One useful feature that is made possible by this arrangement is to have each function receive a sync signal in the broadcast and to flash an LED in response to this signal. With a similar LED blinking to the same sync signal on the logic function board, a simple glance is all that is needed to know that each function board is in steady communication with the logic function board.

Figure 4:
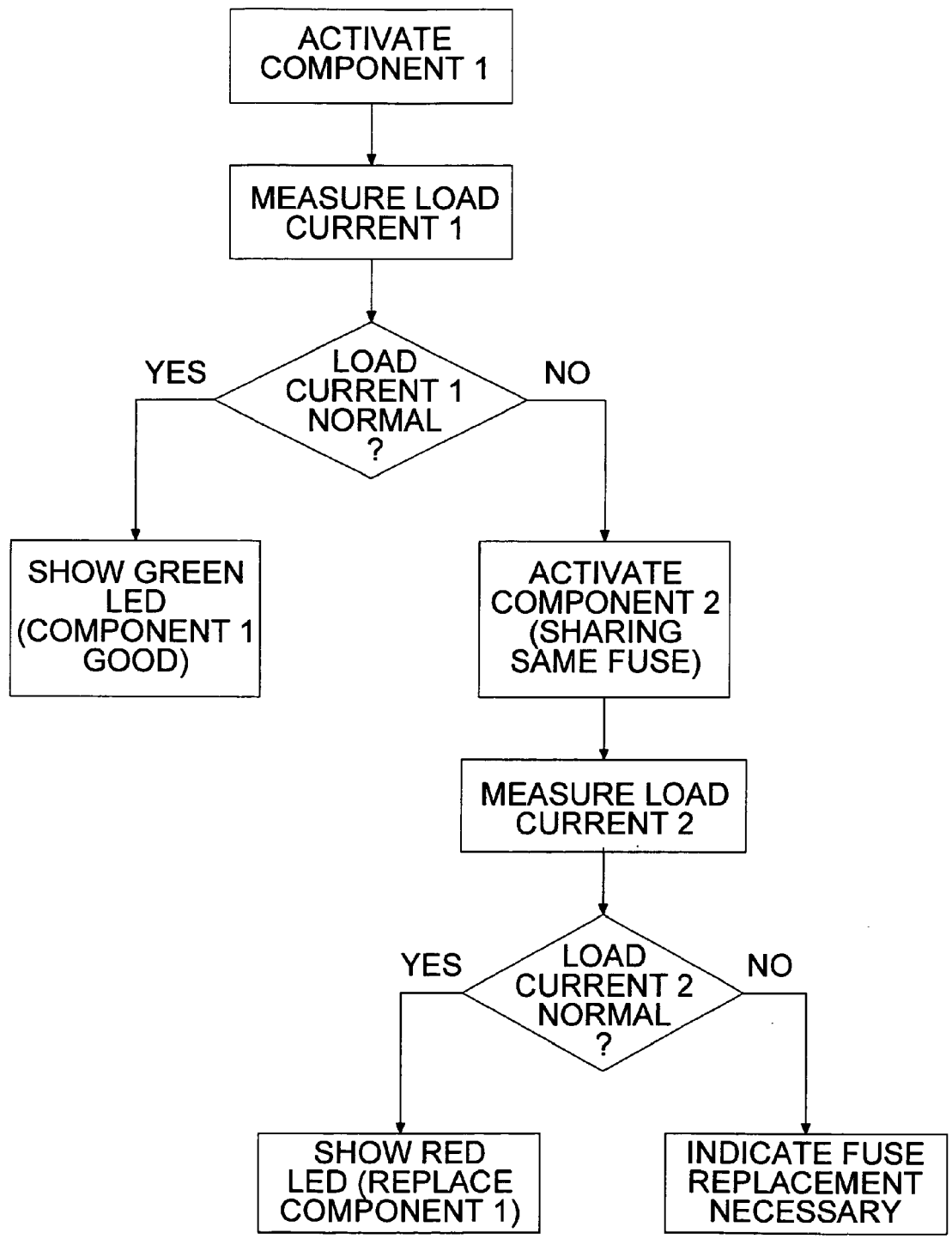
FIG. 4 is a logic flow chart that illustrates a typical instant evaluation of a spa component leading to the selection of a LED status color.

Referring now to FIG. 4, a flow chart illustrates an example of an instant evaluation of a component when it is first energized. If the load current is within expected limits, a green status LED is activated immediately. If the load current is absent, an attempt is made to energize other components that share the same circuit element, such as a fuse. If these other components have normal load currents, it can be concluded that the fuse is not defective and the original component is probably defective. A red status LED is then energized for the component. Other tests are similar to this example.

Figure 5:
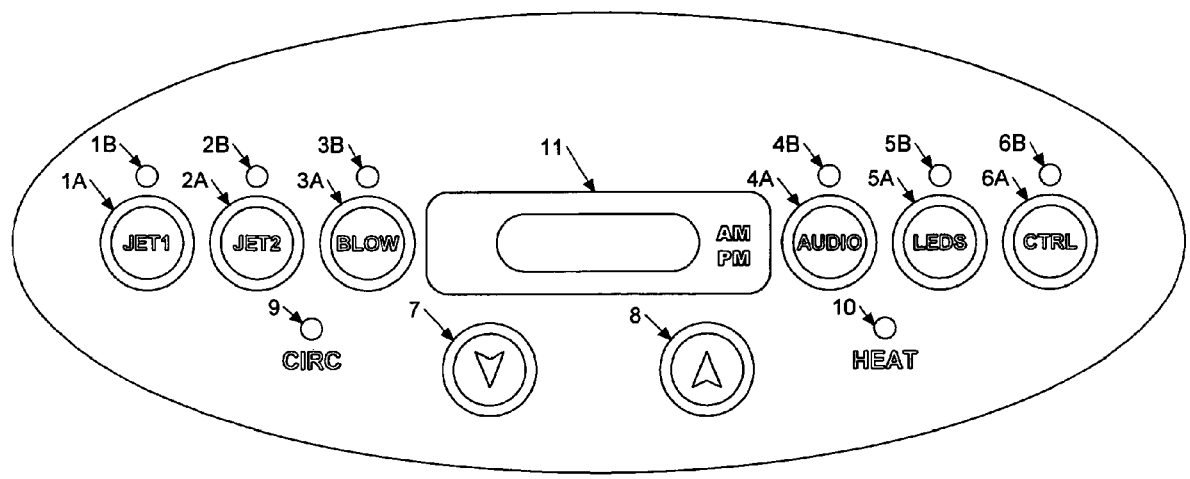
FIG. 5 shows a user interface panel with buttons for activating components and associated multi-colored LEDs.

Referring to FIG. 5, a user interface is shown as a spaside control with display 11, buttons 1A-6A, 7, 8 and LEDs 1B-6B, 9, 10. Note that the buttons have regions that indicate which component they control and the LEDs are closely associated with the buttons. In this manner, the LEDs are also associated with the same components and are useful for troubleshooting the components.

In keeping with the objective of a spa control system with improved reliability and maintainability, other novel techniques are used in the preferred embodiment. Each relay used on Board 1 is connected to an optical coupler that is used to verify that a relay actually closes when the logic function directs it to close. These optical couplers and a built-in current sensor allow for easy implementation of the self test techniques taught in U.S. Pat. No. 6,756,907, Hollaway. Resettable fuses are used in the low voltage connections between Board 1 and Functions 6, 7, and 8 to avoid damage to Board 1 in case of electrical shorts in one of the functions, and to isolate possible power losses so that the main processor can continue to do it's function.

Each function board has a unique pattern in it's connection to identify it's presence and revision level. The logic function uses this identification to adjust it's treatment and demands on the revised function board.

Another novel function is a flash memory circuit that works in conjunction with the logic function to maintain a detailed history of the spa's operation over several days. Data collected includes temperatures, line current, time and status of the several motors. This data is extracted on demand by the logic function and provided to a user interface directly or to a wireless link function for transmission to a PC for troubleshooting and analysis.

Another use of the collected data is to determine when certain pumps and blowers may need to be purged of stale water. If a pump, for example, has been in operation within the last few hours, there is probably no need to waste energy and create noise by running the pump during the period of time reserved for purging components.

Yet another use of collected data could be to keep track of abnormal load currents so that in the event of a circuit breaker trip, the component with the abnormal current could be identified as the cause of the tripping. This identification would take place after the circuit breaker is reset and the logic circuit has a chance to analyze the data just prior to the tripping.

Others skilled in the arts may use this invention to make other improvements without departing from what is taught herein.

What is claimed is:

1. A low maintenance spa control system that eliminates the need for mechanical flow or pressure monitoring devices, the spa having a main body of water, a water pump, and a spa water heater having an electrically-powered heating element within a heater housing through which water flows during a heating cycle with the water pump activated, the spa control system comprising:

a water temperature sensor thermally coupled to the main body of water for the spa, a heater temperature sensor thermally coupled to the spa water heater element, wherein said sensor thermally coupled to said heater is located very near the heating element of said heater in order to measure the actual temperature of said heating element, logic means connected to said sensors and configured to receive signals from said water temperature sensor and said heater temperature sensor to manage operation of the electrically powered heating element and the water pump, and power switching means connected to said logic means to activate said heater during the heating cycle only when said temperature sensors indicate that the temperatures at their respective locations are within a prescribed difference of each other and thereby indicate the presence of flowing water through the heater housing during the heating cycle and that the water and heater sensors are working properly;

wherein mechanical water flow and mechanical water pressure monitoring devices are absent from the system.

2. The system in claim 1, wherein said sensor thermally coupled to said heater is located as close as possible to the heating element of said heater in order to measure the actual temperature of said element.

3. The system in claim 1, wherein said logic means comprises two or more processor means able to react independently to said sensors in a failsafe manner, and wherein one of said processor means is configured to de-energize the water heater whenever either said water temperature sensor or said heater temperature measures a temperature greater than a prescribed temperature.

4. The system in claim 1, wherein said difference is an absolute difference, wherein heater operation will be disabled even if the temperature at the heater sensor is cooler than the temperature at the water sensor by more than said prescribed difference, and is also disabled if the temperature at the heater sensor is higher than the temperature at the water sensor by more than said prescribed difference.

5. A method for evaluating the performance of certain components in a spa each time said components are activated by measuring operational parameters of said components, comprising a sequence of the following steps:

monitoring a current sensor;

activating a given one of the certain components the spa during bathing operation, said given one of the certain components connected to a circuit element;

for each time the given one of the certain components is activated, determining as a result of monitoring the current sensor whether a load current drawn by the given one of the components is within expected limits;

if the load current drawn by the given one of the components is not within expected limits, activating another component sharing the circuit element to determine whether said given one of said components is defective.

6. The method of claim 5, wherein said activating another component sharing the circuit element to determine whether said given one of said components is defective comprises:

measuring the load current with said another component activated, and if normal, determining that said given one of said components is defective, and if not normal, determining that the circuit element should be checked.

7. The method of claim 5, further comprising:

visually indicating the results of said determining whether a load current drawn by the given one of the components is within expected limits by providing a first visual indication if the load current is within expected limits, and by providing a second visual indication if the load current is not within expected limits.

8. The method of claim 7, wherein said visually indicating the results of said determining comprises activating a multi-color light display system on a spa side control panel to produce the respective first and second visual indications.

9. The method of claim 8, wherein said multi-color light display system is configured to produce two or more colors associated with each of said certain components, with one of said colors used to indicate normal performances of said components and another of said colors used to indicate abnormal performances of said components.

10. The method of claim 5, wherein said monitoring the current sensor and the activating of said components produces information which is stored in memory for later evaluation of said components.

11. The method of claim 10, further comprising:

selectively purging stale water from components only when said information stored in memory indicates that certain of said components have not been in operation within a prescribed period of time.

12. A low maintenance spa control system, comprising:

a controller configured to perform logic functions to manage spa operations including water temperature control and motor activation, said logic functions further including a logic function for evaluating the performance of certain components of the spa;

a multi-color light system on a user interface to indicate the operational status of components of the spa as determined by said logic function for evaluating the performance of certain components of the spa, said components including at least one of a high speed pump, a low speed pump, a circulation pump, a water heater and a blower; and wherein said multi-color light system produces two or more colors with one of said colors used to indicate normal performance of said components and another of said colors used to indicate abnormal performance of said components.

13. The system of claim 12, wherein said multi-color light system comprises LEDs.

14. The system of claim 12, wherein said multi-color light system is configured to produce multi-color light effects associated with buttons, or other user interface areas, associated with corresponding ones of said components of said spa.

15. A low maintenance spa control system for controlling operation of spa components, comprising:

a controller including a memory;

the controller including a logic function configured to store in said memory collected data of a detailed history of the spa operation over a time period;

the controller configured to periodically perform a purge of stale water from at least certain of the spa components by activating selected components during a time period for purging components, the controller further configured to use said stored collected data to determine that a component not be activated to be purged of water during said time period if it has been recently been in operation.

16. The system of claim 15, wherein said certain components include a water pump.

17. The system of claim 15, wherein said collected data includes temperatures, line current, time and status of component motors.

18. The system of claim 5, wherein said common circuit element is a fuse.

19. The system of claim 14, wherein the user interface is a spaside control with a display and said buttons or other user interface areas.

* * * * *